(12) United States Patent
Mizzo et al.

(10) Patent No.: US 8,608,086 B1
(45) Date of Patent: Dec. 17, 2013

(54) ATTACHMENT BRACKET FOR AN RFID TAG

(71) Applicant: PINC Solutions, Alameda, CA (US)

(72) Inventors: Richard R. Mizzo, Danville, CA (US);
Sing Yiu Cheung, South San Francisco, CA (US)

(73) Assignee: PINC Solutions, Alameda, CA (US)

( * ) Notice: Subject to any disclaimer, the term of this patent is extended or adjusted under 35 U.S.C. 154(b) by 0 days.

(21) Appl. No.: 13/717,320

(22) Filed: Dec. 17, 2012

(51) Int. Cl.
*G06K 19/06* (2006.01)

(52) U.S. Cl.
USPC .......................................................... 235/492

(58) Field of Classification Search
USPC .......................................................... 235/492
See application file for complete search history.

(56) References Cited

U.S. PATENT DOCUMENTS

2004/0074974 A1* 4/2004 Senba et al. ................... 235/492
2012/0175491 A1* 7/2012 Chen et al. ..................... 248/683

FOREIGN PATENT DOCUMENTS

KR     2011087045 A * 8/2011
KR     2011101017 A * 9/2011

* cited by examiner

*Primary Examiner* — Daniel Hess
*Assistant Examiner* — Steven J Malone
(74) *Attorney, Agent, or Firm* — Michael A. Glenn; Perkins Coie LLP

(57) ABSTRACT

An apparatus for temporarily attaching an RFID tag to a mobile object includes a bracket comprising a first arm comprising an object mounting surface, and a second arm comprising a tag mounting surface. The first arm further comprises an attachment mechanism used to attach the bracket to a support surface.

17 Claims, 2 Drawing Sheets

US 8,608,086 B1

ATTACHMENT BRACKET FOR AN RFID TAG

TECHNICAL FIELD

The invention relates to a bracket used for mounting a tag that is used to identify the location of mobile objects in real time. More particularly, the invention relates to a bracket for mounting a removable tag for installation on trucks, trailers, intermodal containers, railcars and the like in the field of yard management.

DESCRIPTION OF THE BACKGROUND ART

There are currently millions of trucks, semi-trailers, railcars, and intermodal containers in use in the United States. For logistics and efficiency it is desirable to know the position in real time of each piece of equipment. In order to do this radio frequency identification (RFID) tags are currently being used.

RFID tags are used to associate an object with an identification code or other information. RFID devices generally have a combination of antennas and analog and/or digital electronics, which may include for example communications electronics, data memory, and control logic.

RFID tags are used in position tracking systems to identify the location of mobile objects in real-time and are used in a wide variety of applications, including transportation, logistics management, healthcare, and security.

For objects that are moved with a vehicle, such as intermodal shipping containers or trailers, being able to locate the position of the objects in real-time can help improve the efficiency of supply-chain and inventory management while reducing the loss in productivity of assets. The use of RFID tags eliminates the need for staff members to search for trailers as well as enables carriers and shippers to access data regarding shipments' locations via the Internet. This is currently done by permanently securing RFID tags directly to objects by means such as screws, bolts rivets and welding. The RFID tags are then read by electronic readers, such as readers installed on gates at the entrance of a yard. The information gathered by the reader is then sent to a yard management system.

Permanent tags have the disadvantages of being labor intensive to install, labor intensive to remove and replace, and requiring a different tag for every object to be tagged. Accordingly, it would be desirable to provide a tag that is not permanent and could be installed, removed and replaced with little labor as well as provide a tag that can be used by multiple objects at different times. Further, it would be desirable to provide a mounting apparatus to attach to the object that provides a surface to attach a nonpermanent tag such that the tag is located in a position that is secure, accessible to a user, and allows the tag to be scanned.

SUMMARY OF THE INVENTION

An apparatus for temporarily attaching an RFID tag to a mobile object includes a bracket comprising a first arm comprising an object mounting surface, and a second arm, adjoining the first arm, comprising a tag mounting surface. The first arm further comprises an attachment mechanism used to attach the bracket to a support surface.

DETAILED DESCRIPTION OF THE INVENTION

Figure 1:
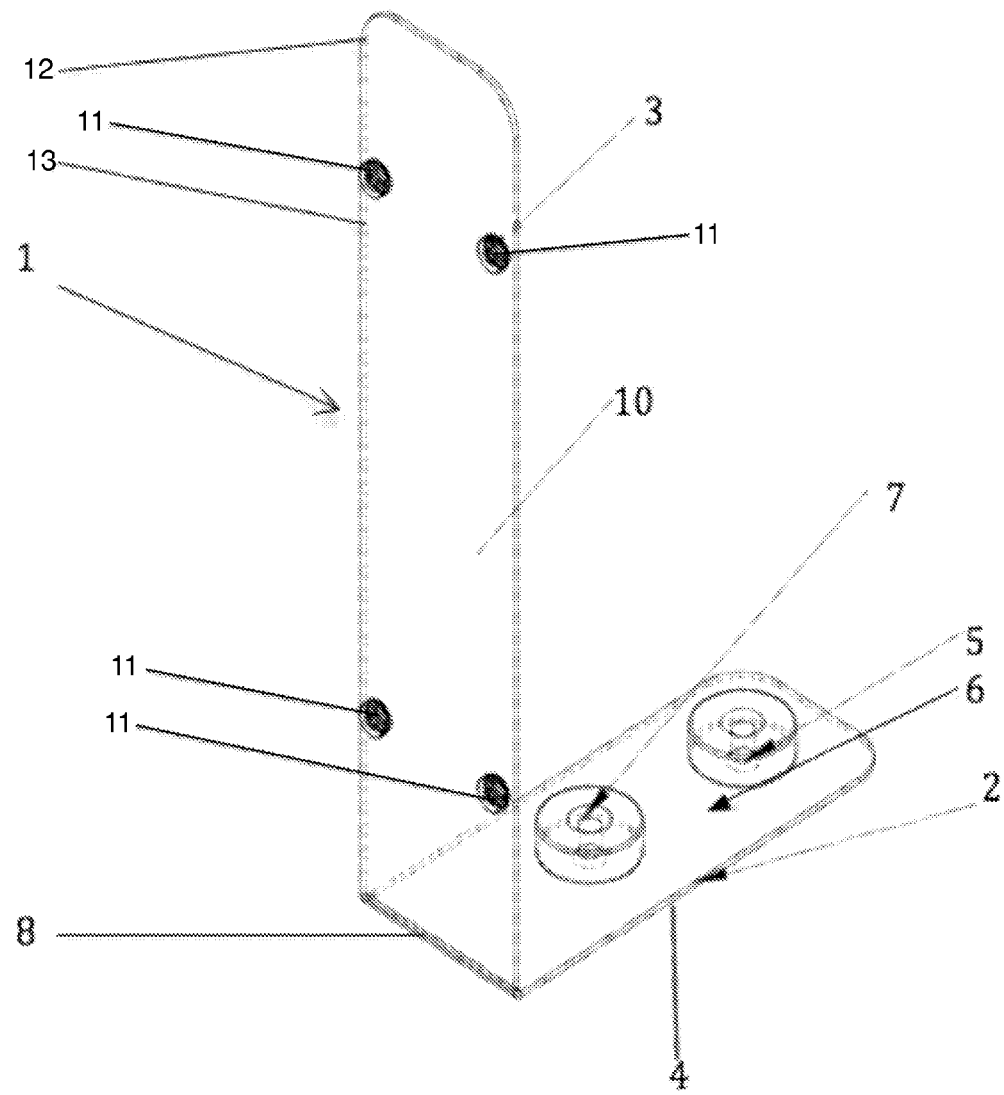
FIG. 1 is a perspective view of a bracket according to the invention.

FIG. 1 shows an embodiment of an L-shaped bracket 1. In the embodiment shown in FIG. 1, a first arm consists of a first substantially planar member 2 adjoining a second arm consisting of a second substantially planar member 3. The first arm comprises an object mounting surface 4 which is in contact with a support surface of a trailer, truck, intermodal container, railcar or the like when the bracket is mounted to the support surface. In embodiments, the first arm and object mounting surface are generally rectangular in shape, however those skilled in the art will appreciate that they may be of any shape designed to fit into specific spaces.

In an embodiment, the first arm is mounted flush with a support surface. In the case of a flat support surface, the object mounting surface is preferably flat, and in the case of a curved support surface the object mounting surface is preferably curved to match the curve of the surface of the object. In some embodiments, the first arm and object mounting surface are constructed to be rigid and in other embodiments, they are constructed to be slightly deformable in order to be flush when attached to support surfaces that are imperfect or that deflect or change shape during use. Further, in embodiments, the object mounting surface comprises a rubberlike coating or layer that increases friction and flushness between the bracket and the support surface to which it is mounted. Further, those skilled in the art will appreciate that the first arm and object mounting surface can be formed to match the shape and surface features of any surface the bracket is to be mounted.

The first arm comprises an attachment mechanism for attaching the bracket to a support surface. In embodiments, the attachment mechanism comprises magnets, electromagnets, adhesives, suction, or mechanical fasteners such as Velcro®, a slot and groove combination, or a clip and flange combination, or any combination thereof.

Trucks, semi-trailers, intermodal containers, railcars, and other equipment commonly used in the shipping, transportation, and warehouse industries contain metal surfaces to which a magnet can be attached using magnetic forces. Therefore, in an embodiment, the attachment mechanism is preferably one or more magnets. As shown in FIG. 1, an embodiment includes two magnets 5 attached to the first substantially planar member 2, which allow the bracket to attach to a metal support surface via magnetic forces. As shown in FIG. 1 in an embodiment, the magnets are attached to a top surface 6 of the first arm with rivets 7. In other embodiments, the magnets are encapsulated within the first arm, are attached to the first arm inside of a recess, or are attached to a bottom surface of the first arm. In embodiments, the magnets are round, square, or any other geometric shape. In embodiments, the magnets are attached to the first arm by adhesive, press fit, rivets, screws, bolts, or any other mechanical fastening means. In embodiments, the holding ability of the attachment mechanism exceeds any challenges posed by air resistance, snow, rain, and vibration. Further, in an embodiment, the bracket is mountable on a wet surface, or a surface covered with one mm of either ice, mud, or both.

The bracket further comprises a connection adjoining the first arm and second arm. In the embodiment shown in FIG. 1, the connection adjoining the arms comprises a bend 8. In some embodiments, the first arm, second arm, and connection adjoining the arms are integrally formed. In some embodiments, the first arm, connection, and second arm are not integrally formed. In embodiments, the angle between the first and second arms is right, obtuse, or acute. In an embodiment, the first arm and second arm are connected by a locking hinge. In this embodiment, the bracket is selectively rotatable between a closed and open position.

Figure 2:
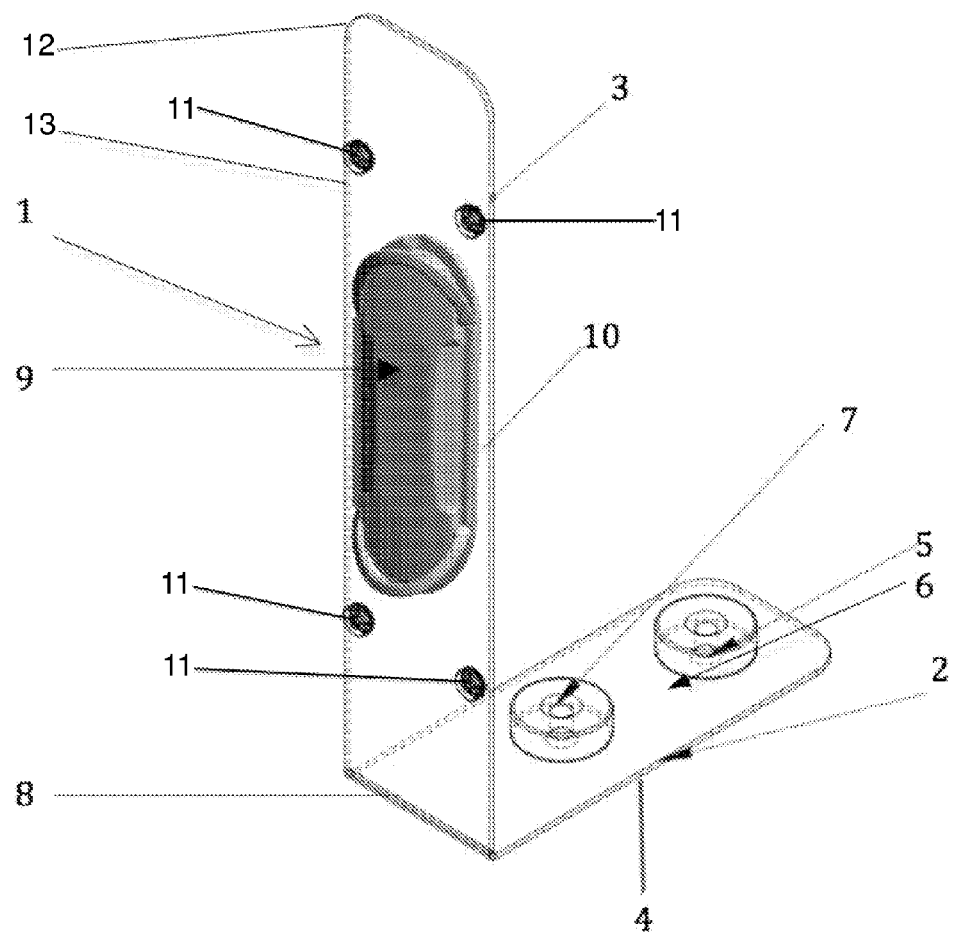
FIG. 2 is a perspective view of a bracket according to the invention with an RFID tag attached.

FIG. 2 shows a bracket with a temporary tag 9 secured to the tag mounting surface 10. In an embodiment, the second arm comprises a material with ferromagnetic properties such that a temporary tag with an attachment mechanism of a magnet can be secured to the second arm of the bracket on the tag mounting surface with magnetic forces. In embodiments, the tag mounting surface is smooth in order to allow various tag attachment mechanisms to secure a tag to the surface, these tag attachment mechanisms including, for example, adhesives, suction or mechanical fasteners. In embodiments, the tag mounting surface comprises a Velcro® surface, or the like, to attach a temporary tag with a complimentary Velcro® surface located on said temporary tag. In embodiments, the second arm contains one or more positioning studs 11 for assisting in proper orientation of the tag on the tag mounting surface. In embodiments, the tag mounting surface is recessed within the second arm.

In embodiments, the bracket is designed and constructed from materials that allow the bracket to withstand vibration and mechanical shock, as well as be waterproof, and resistant to UV light and chemical hazards, for example such as sulfuric acid and salt water.

In the preferred embodiment, the bracket is constructed of galvanized steel, however in other embodiments, other materials are used such as plastics, other metals, and composites; or any combination thereof. Further, those skilled in the art will appreciate that other materials and combinations thereof can be used to construct the bracket. In embodiments, the first arm, second arm and bend are constructed from a single strip of sheet metal.

In embodiments, the bracket is constructed using a material that may be made to a custom color, or may have a coating, such as a paint, applied to it to give it a custom color. The purpose of such custom color may be for military purposes, or for quick visual reference to determine information such as ownership, contents, or point of origin. Further in an embodiment, the bracket may glow in the dark.

Further, in an embodiment, the bracket does not have sharp edges and hook-like features that would be prone to snagging and pulling the bracket away from the support surface to which the bracket is attached. In an embodiment, the corners of the bracket include curved ends 12 and straight sides 13.

Further, the bracket is intended for use outdoors and embodiments include design features that are optimized to slough off accumulation of water and snow. In embodiments, the bracket does not have cavities where water and ice could accumulate. Further, in embodiments, the bracket is treated with coatings designed to repel snow or water.

In embodiments, a handle is provided to allow a person to mount and dismount the bracket without the use of any special tools. In embodiments, the handle comprises a separate handle attached to the first arm, second arm, or both. In embodiments, the first arm, second arm, or both comprise an integrated handle feature that allows one of the arms to be grasped easily and used as a handle for mounting and dismounting the bracket. The integrated handle features including, for example, a portion of the arm in the shape of a cylindrical or partial cylindrical grip, a portion of the arm having finger indentations, or a portion of the arm having a rubberlike surface.

Although the invention is described herein with reference to the preferred embodiment, one skilled in the art will readily appreciate that other applications may be substituted for those set forth herein without departing from the spirit and scope of the invention. Accordingly, the invention should only be limited by the Claims included below.

The invention claimed is:

1. An RFID bracket assembly, comprising:
 a first substantially planar member;
 a second substantially planar member adjoining said first substantially planar member to define an angular relationship therebetween;
 said first substantially planar member comprising an attachment mechanism for detachably securing said bracket to a support;
 said second substantially planar member having an RFID tag secured thereto; and
 a locking hinge adjoining said first substantially planar member and said second substantially planar member to each other;
 wherein said first substantially planar member and said second substantially planar member are selectively rotatable at said hinge to configure said bracket between a closed position and an open position.

2. The bracket according to claim 1, wherein the attachment mechanism comprises at least one magnet.

3. The bracket according to claim 2, wherein the attachment mechanism comprises two magnets attached to a top surface of the first substantially planar member.

4. The bracket according to claim 2, wherein at least one magnet is attached to the first substantially planar member with a rivet.

5. The bracket according to claim 1, wherein said second substantially planar member comprises a ferromagnetic material with which said RFID tag is secured to said second substantially planar member with magnetic forces.

6. The bracket according to claim 1, wherein said first substantially planar member or said second substantially planar member comprises a handle portion.

7. The bracket according to claim 1, wherein said second substantially planar member comprises at least one positioning stud specifically configured for positioning an RFID tag on said second substantially planar member.

8. An RFID bracket assembly, comprising:
 a first arm;
 a second arm adjoining said first arm to define an angular relationship therebetween;
 an RFID tag;
 said first arm comprising an attachment mechanism for detachably securing said RFID bracket assembly to a support;
 said second arm comprising a tag mounting surface;
 said RFID tag secured to said tag mounting surface; and
 a locking hinge adjoining said first arm and said second arm to each other;
 wherein said first arm and said second arm are selectively rotatable at said hinge to configure said bracket between a closed position and an open position.

9. An RFID bracket assembly according to claim 8, wherein said RFID tag is secured to said tag mounting surface with magnetic forces.

10. An RFID bracket assembly according to claim 8, wherein the attachment mechanism comprises at least one magnet.

11. An RFID bracket assembly, comprising:
 a first substantially planar member;
 a second substantially planar member adjoining said first substantially planar member to define an angular relationship therebetween;

said first substantially planar member comprising an attachment mechanism for detachably securing said bracket to a support surface;

said second substantially planar member having an RFID tag secured thereto;

a mounting surface, provided on said attachment mechanism, comprising a rubberlike coating or layer that increases friction and flushness between the bracket and the support surface to which it is mounted; and a locking hinge adjoining said first arm and said second arm to each other;

wherein said first arm and said second arm are selectively rotatable at said hinge to configure said bracket between a closed position and an open position.

12. The bracket according to claim 11, wherein the attachment mechanism comprises at least one magnet.

13. The bracket according to claim 12, wherein the attachment mechanism comprises two magnets attached to a top surface of the first substantially planar member.

14. The bracket according to claim 12, wherein at least one magnet is attached to the first substantially planar member with a rivet.

15. The bracket according to claim 11, wherein said second substantially planar member comprises a ferromagnetic material with which said RFID tag is secured to said second substantially planar member with magnetic forces.

16. The bracket according to claim 11, wherein said first substantially planar member or said second substantially planar member comprises a handle portion.

17. The bracket according to claim 11, wherein said second substantially planar member comprises at least one positioning stud specifically configured for positioning an RFID tag on said second substantially planar member.

* * * * *